W. F. COCHRANE.
Harvester.
No. 46,179. Patented Jan'y 31, 1865.
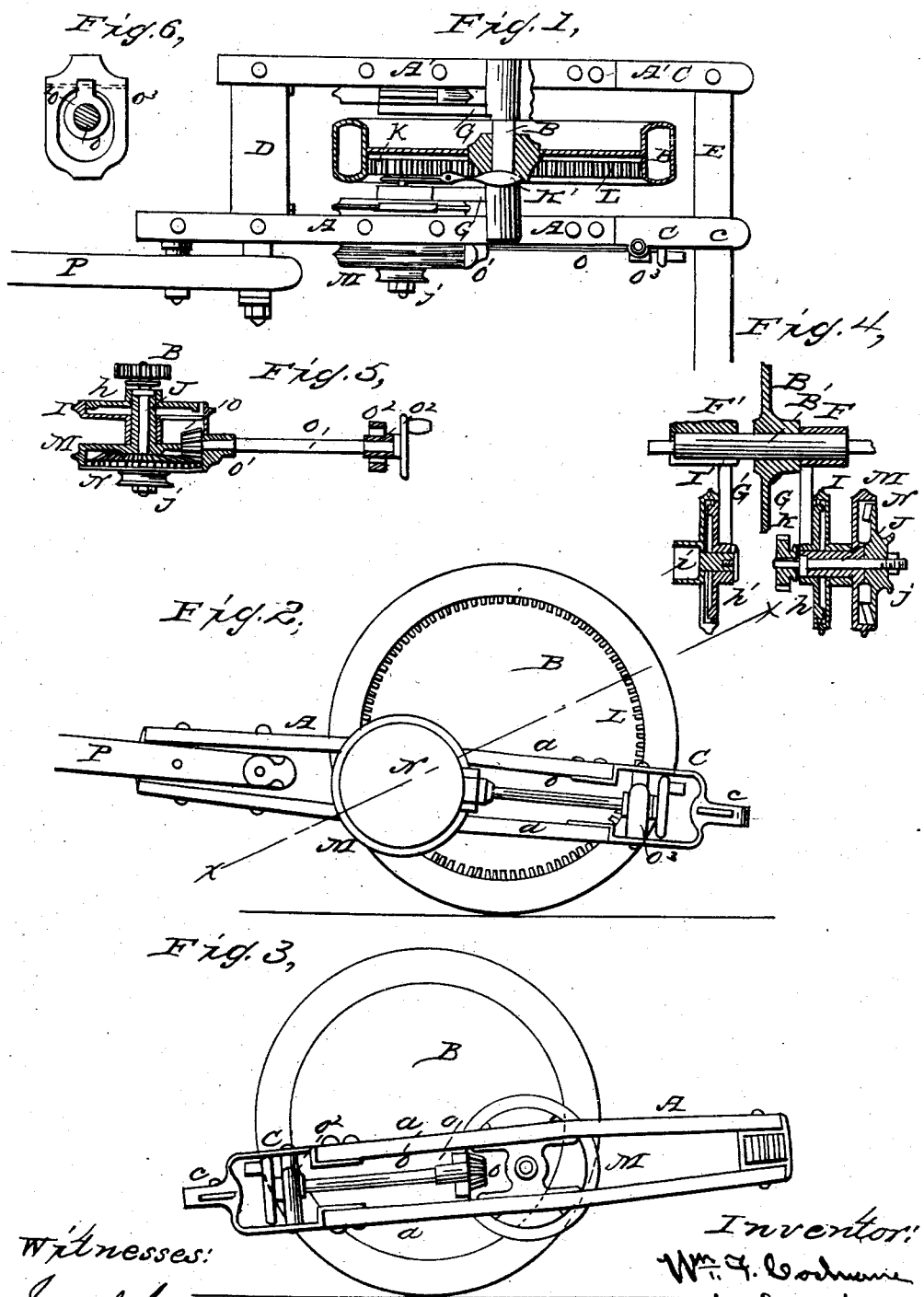

UNITED STATES PATENT OFFICE.

WM. F. COCHRANE, OF SPRINGFIELD, OHIO, ASSIGNOR TO HIMSELF AND WARDER & CHILD, OF SAME PLACE.

IMPROVEMENT IN HARVESTERS.

Specification forming part of Letters Patent No. 46,179, dated January 31, 1865.

*To all whom it may concern:*

Be it known that I, WILLIAM F. COCHRANE, of Springfield, in the county of Clarke and State of Ohio, have invented a new and useful Improvement in Harvesters, of which the following is a full, clear, and exact description, reference being had to the accompanying drawings, which make part of this specification, and in which—

Figure 1 represents a plan or top view of so much of a harvester embracing my improvements as is necessary to illustrate my invention, the driving-wheel being shown in section. Fig. 2 represents a view in elevation of the gearing side of the same. Fig. 3 represents a similar view of the inner side of the frame which carries the gearing. Fig. 4 represents a section through the gearing at the line $x$ $x$ of Fig. 2. Fig. 5 represents a plan or top view, partly in section, of the gearing detached from the frame. Fig. 6 represents a view, partly in section, of the crank-shaft and its swiveling bearing.

The improvement herein claimed consists, first, in mounting the crank-shaft in swiveling bearings to allow the frame to work or twist without straining or binding the gearing; second, in so combining the shell-bracket and gearing as effectually to exclude dirt therefrom; third, in so combining the crank-shaft with the main frame and brackets that it shall revolve within and be protected by them; fourth, in so combining the shell-brackets and counter-shaft that the shaft shall pass through the center of the brackets; fifth, in so combining the main frame, driving-wheel, and driving-pinion that the driving-wheel may serve as a rack upon which to raise and lower the machine.

In the accompanying drawings, which exemplify one mode of carrying out the objects of my invention, the main frame is shown as consisting of girder side beams, A A′, consisting of bars $a$ $a'$, arranged in pairs one above the other on each side of the driving-wheel B, and united by brackets C C′ in such manner as to leave an open space between the upper and lower bars. The side pieces may be connected in front by a tool-box, D, and in rear by the heel of the finger-beam E.

The driving-wheel B in this instance is shown as revolving upon a tube, B′, secured firmly to pipe-boxes F F′. Radius-bars G G′ are firmly secured to these boxes and to disks $k$ $h'$, which turn on bearings $i$ $i'$, forming part of the shell-brackets I I′. The disks have on their inner faces small bosses, which enter corresponding notches in the flanges of the brackets, and thus lock the disks and brackets securely together while permitting the disks to turn freely within the brackets.

Ratchets H upon the disks engage with pawls H′, pivoted to the shell-brackets I I′, and hold the machine at any desired height above the ground. It can be lowered by merely releasing the pawls from the ratchets, when the frame drops by its own weight.

The stud or bearing $i$ is perforated, and the counter-shaft J passes through it. By this arrangement the counter-shaft passes through the radius-bracket I and the gearing-bracket M, which gives it a long bearing and causes it to run steadily. The counter-shaft, moreover, forms the center or axis of motion on which the radius-bars G turn. No matter how much, therefore, the frame may be raised or lowered, the distance between the counter-shaft and driving-axle B′ always remains the same, and consequently the driving-gear L and pinion K always mesh properly into each other.

A shell, M, upon the outer side of the gearing-frame incloses within its flange the bevel-wheel N and pinion $o$, thus protecting the gearing from dirt. The bevel-wheel N is mounted on the counter-shaft J, and drives the pinion $o$ on the crank-shaft O, which actuates the cutter.

By reference to the drawings it will be seen that the crank-shaft O is pivoted to the shell M in such manner that its bearing $o'$ has a slight horizontal play, while its rear bearing, $o^2$, is pivoted to play vertically in a yoke, $o^3$, which is in turn pivoted to play horizontally between the upper and lower frame-timbers, $a$ $a$, by which means the shaft is allowed play enough to accommodate itself to any warping or twisting of the frame, and thus prevent binding or straining the gearing. It will likewise be observed that the counter-shaft is in effect mounted in a metal gear-frame, which of course cannot yield, by which the effective operation of the gearing is much promoted. By this mode of construction the crank-shaft is brought within the frame between its upper and lower side timbers, by which means I am enabled both to diminish the width of the frame and to protect the shaft from injury. The mechanism is thrown into and out of gear by sliding the pinion K endwise on the counter-shaft, a hand-lever $k$ being provided for that purpose.

Another advantage of this mode of arranging the gearing is that when the machine is at rest it can be raised by putting a wrench or lever on the end of the counter-shaft J (a nut, $j$, being provided for that purpose) and turning it, the pinion K will be caused to travel up the gear-wheel L, and thus raise the frame, which will be held up by the ratchets H, as hereinbefore described, the gear-wheel thus forming a rack upon which the pinion K raises the frame.

The tongue P is pivoted to the frame in such manner as to prevent it to be raised or lowered, or to be held at any desired height from the ground.

It is deemed unnecessary here to describe in detail the construction and operation of the other parts of the machine, as they form no part of the subject-matter herein claimed, and are, moreover, fully described in other applications filed simultaneously with this one, and respectively marked A, B, D, and E.

What I claim herein as new, and desire to secure by Letters Patent of the United States, is—

1. Mounting the crank-shaft in swiveling bearings, substantially in the manner described, for the purpose set forth.

2. The combination of the shell-bracket M with the bevel-wheel N and pinion $o$, as decribed, for the purpose of protecting the gearing.

3. Arranging the crank-shaft between the frame-timbers $a$ $a$ and within the brackets C', as and for the purposes described.

4. Mounting the counter-shaft in the brackets I M, constructed in the manner described, and for the purposes specified.

5. The combination of the driving-wheel, spur-pinion, pinion-shaft, and nut J with the main frame, substantially in the manner described, for the purpose of raising the frame, as described.

In testimony whereof I have hereunto subscribed my name.

WM. F. COCHRANE.

Witnesses:
H. E. FOLGER,
GROVE W. GREEN.